US009074694B2

(12) United States Patent
Hoppe et al.

(10) Patent No.: US 9,074,694 B2
(45) Date of Patent: Jul. 7, 2015

(54) CONTROL VALVE FOR HYDRAULIC MEDIA

(71) Applicant: Schaeffler Technologies AG & Co. KG, Herzogenaurach (DE)

(72) Inventors: Jens Hoppe, Erlangen (DE); Stefan Konias, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 139 days.

(21) Appl. No.: 13/739,120

(22) Filed: Jan. 11, 2013

(65) Prior Publication Data
US 2013/0199634 A1 Aug. 8, 2013

(30) Foreign Application Priority Data

Feb. 2, 2012 (DE) .................. 10 2012 201 548

(51) Int. Cl.
*F16K 11/065* (2006.01)
*F16K 17/00* (2006.01)
*F16K 15/08* (2006.01)
*F01L 1/344* (2006.01)

(52) U.S. Cl.
CPC .......... *F16K 17/00* (2013.01); *Y10T 137/7849* (2013.01); *F16K 15/08* (2013.01); *F01L 2001/34426* (2013.01); *F01L 2001/3444* (2013.01)

(58) Field of Classification Search
CPC .. F16K 17/00; F16K 15/08; F01L 2001/3444; F01L 2001/34426
USPC ...................... 137/625.25, 550, 860
See application file for complete search history.

(56) References Cited

U.S. PATENT DOCUMENTS

| 6,899,126 B2 * | 5/2005 | Weigand et al. .......... 137/512.15 |
| 7,600,531 B2 * | 10/2009 | Patze et al. ............... 137/512.15 |
| 8,225,818 B1 * | 7/2012 | Stephens et al. ......... 137/625.68 |
| 8,316,889 B2 | 11/2012 | Hoppe et al. |
| 8,490,654 B2 * | 7/2013 | Hoppe et al. ............. 137/625.68 |
| 8,684,041 B2 * | 4/2014 | Konias et al. ................ 137/853 |
| 2003/0070713 A1 * | 4/2003 | Cornea et al. ............ 137/512.15 |
| 2004/0244852 A1 * | 12/2004 | Cornea et al. ............ 137/625.69 |
| 2005/0092371 A1 * | 5/2005 | Delgado ...................... 137/526 |
| 2006/0021933 A1 * | 2/2006 | Radcliffe ...................... 210/483 |

FOREIGN PATENT DOCUMENTS

DE 20023304 9/2003
DE 102006022402 A1 5/2006

* cited by examiner

*Primary Examiner* — John K Fistoe, Jr.
*Assistant Examiner* — Kevin Barss
(74) *Attorney, Agent, or Firm* — Volpe and Koenig, P.C.

(57) ABSTRACT

A control device for hydraulic media with a control valve, in particular, a proportional valve that has a sleeve housing provided with radial openings, wherein at least one pressurized flow feed line, at least one control line, and at least one return line are connected to the openings, and the opening for the pressurized flow feed line is connected to a ring-shaped groove, with a control slide that has control edges and is supported in the sleeve housing so that it can move in the axial direction and is actuated by an electromagnetically constructed control unit, advantageously for controlling a phase adjustment device for the variable adjustment of the control times of gas exchange valves of a reciprocating piston internal combustion engine. A non-return valve is installed in the pressurized flow feed line or in the ring-shaped groove that is arranged in the sleeve housing.

10 Claims, 4 Drawing Sheets

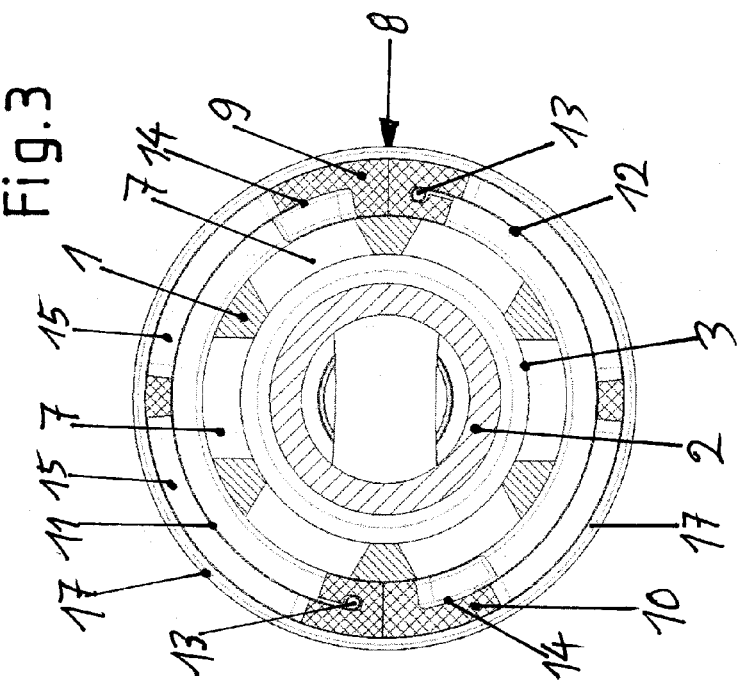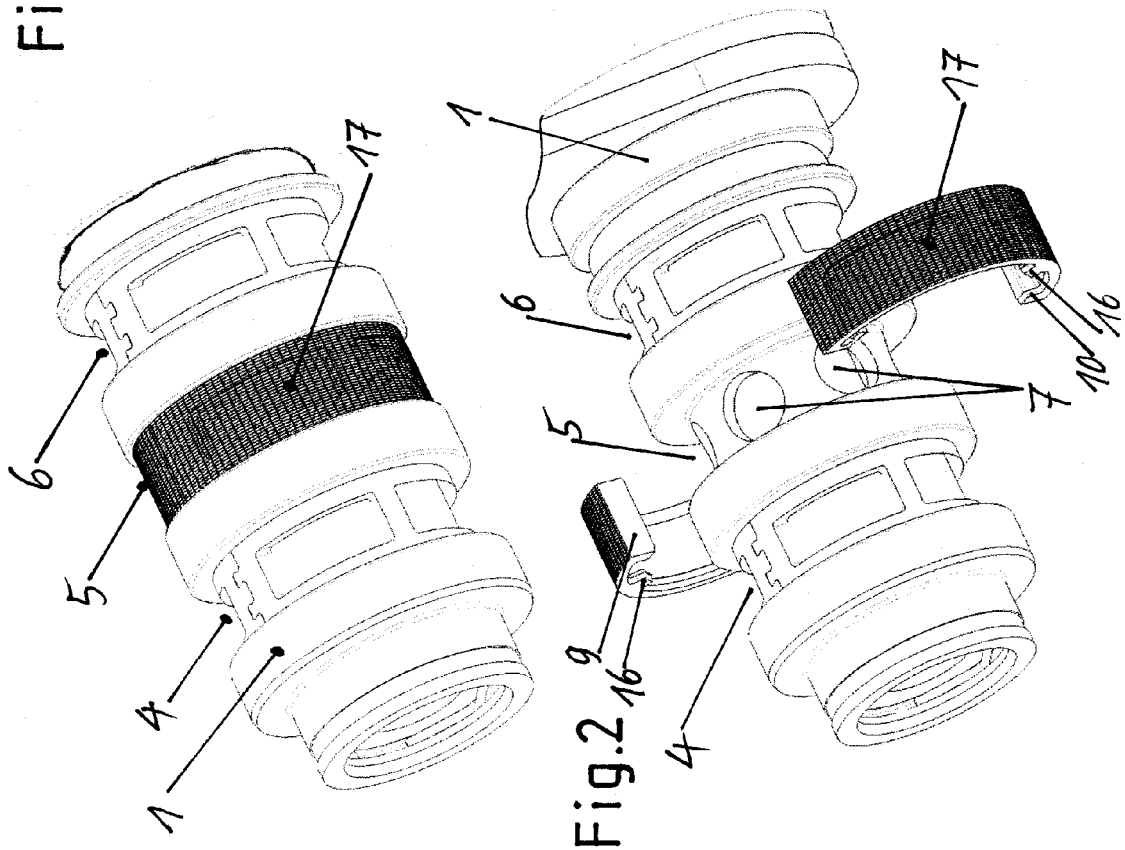

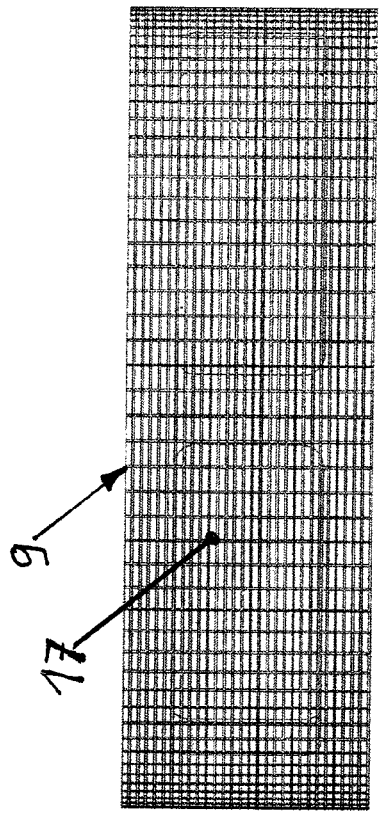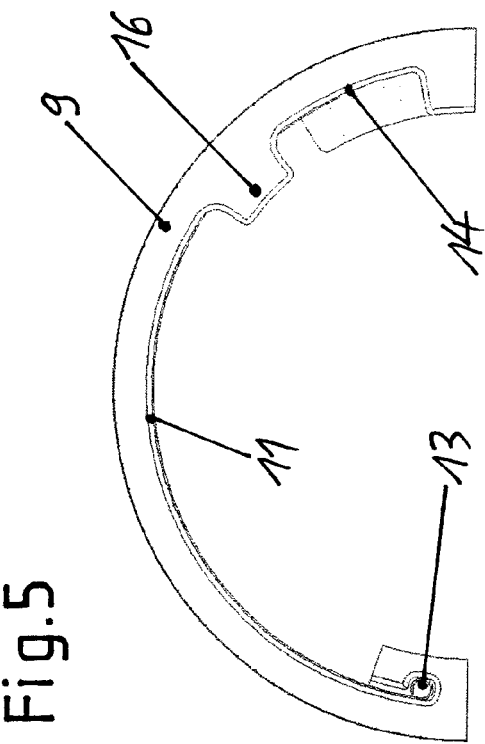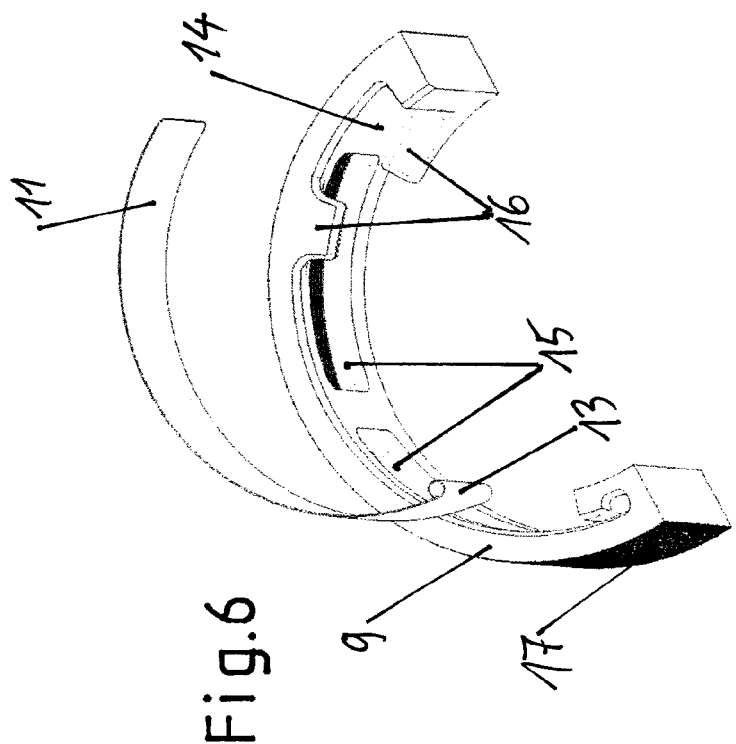

CONTROL VALVE FOR HYDRAULIC MEDIA

INCORPORATION BY REFERENCE

The following documents are incorporated herein by reference as if fully set forth: German Patent Application No. 102012201548.5, filed Feb. 2, 2012.

FIELD OF THE INVENTION

A control device for hydraulic media with a control valve, in particular, a proportional valve that has a sleeve housing provided with radial openings, wherein at least one pressurized flow feed line, at least one control line, and at least one return line are connected to the openings, and wherein at least the openings for the pressurized flow feed line are connected to a ring-shaped groove, with a control slide that has control edges and is supported in the sleeve housing so that it can move in the axial direction and is actuated by an advantageously electromagnetically constructed control unit, advantageously for controlling a phase adjustment device for the variable adjustment of the control times of gas exchange valves of a reciprocating piston internal combustion engine.

BACKGROUND

Such a control device with a control valve is known from DE-200 23 304 U1. In this control valve, one pressurized flow feed line, two control lines to the phase adjustment device, and two outflow lines are provided. The individual lines are in active connection with ring-shaped grooves in the sleeve housing, wherein filters are inserted into the ring-shaped grooves.

In particular, in sub-regions of the operating spectrum of the reciprocating piston internal combustion engine, the adjustment speed and the adjustability of the phase adjustment device are not satisfactory. This is especially the case at low engine speeds and high temperatures of the reciprocating piston internal combustion engine, wherein then a low motor oil pressure is provided, so that a low hydraulic pressure is applied in the pressurized flow feed line.

SUMMARY

The objective of the invention is therefore to improve the disadvantages of the described control device with control valve, wherein sufficient pressure should always be provided in the control valve and in the control line or lines. This should be realized without additional installation expense for the overall system of the phase adjustment device, wherein the solution also should not require any additional installation space. Finally, it should be possible to implement the solution with simple and economical means.

This objective is met by installing a non-return valve in the pressurized flow feed line or in the ring-shaped groove that is advantageously arranged in the sleeve housing. This arrangement guarantees that even for operating states with low motor oil pressure and thus low hydraulic pressure in the pressurized flow feed line, a reliable control can be performed, because, in particular, pressure fluctuations, or so-called pressure peaks, are shielded. If the non-return valve in the ring-shaped groove is provided in the sleeve housing, then this could also be later installed or mounted on control valves with ring-shaped grooves.

Advantageously it is provided that the non-return valve has one or more non-return plates and one or more frame parts. The non-return plates and frame parts advantageously have ring-shaped constructions and easily find space in the ring-shaped groove in the sleeve housing.

The non-return plates and frame parts are adapted to each other so that the non-return plates are in sealing contact with inner surfaces of the frame parts, wherein the frame parts have flow openings and are guided, outside of these openings, in a sealed way in the ring-shaped groove and/or on a guide housing surrounding the sleeve housing. In this way, the pressurized flow fluid is led from the pressurized flow feed line through flow openings into the frame parts via the non-return plates to openings in the sleeve housing and is actuated accordingly at its inner edges by the control edges. On the other side, the non-return plates close when the pressure in the pressurized flow feed line is less than in the openings in the sleeve housing and maintain the pressure in the control valve.

Advantageously, two non-return plates and two frame parts are provided, wherein the non-return plates are guided on one side on the frame parts and thus can easily release or block the hydraulic fluid. The frame parts are here clipped to each other or welded ultrasonically or bonded, so that they are fixed in the ring-shaped groove of the sleeve housing. The frame parts advantageously have guide tabs, in particular, guide tabs that are directed inward and guide the non-return plates or a one-piece non-return plate to be described below. The frame parts can also have filter fabrics, advantageously on their outer side, so that, apart from the guidance for the non-return plate or plates, they also carry the filter fabric.

In another construction of the invention, it is provided that a one-piece non-return plate is provided that forms a full ring or a slotted full ring and is arranged within one or more frame parts. For installing a full ring without a slot, this can be expanded elastically in the radial direction, so that it can be pushed up to the corresponding ring-shaped groove. It can also be pressurized flow so that it opens up the flow cross section.

Corresponding to a one-piece non-return plate, the frame part can also have a one-piece construction, wherein two frame parts are attached to each other and form a slotted full ring that is held closed after closing by the previously described measures or by a guide housing surrounding the sleeve housing.

BRIEF DESCRIPTION OF THE DRAWINGS

For the further explanation of the invention, reference is made to the drawings in which embodiments of the invention are shown simplified. Shown are:

FIG. 1: a perspective view of a sleeve housing with proposed non-return valve, FIG. 2: a perspective view corresponding to FIG. 1 with opened non-return valve, FIG. 3: a section through the non-return valve and the sleeve housing according to FIG. 1, FIG. 4: a top view of the non-return valve, FIG. 5: a side view of a frame part of a non-return valve with non-return plate, FIG. 6: a perspective view of a frame part and non-return plate similar to FIG. 5, FIG. 7: a section corresponding to FIG. 3 with two semicircular frame parts and a one-piece non-return plate.

DETAILED DESCRIPTION OF THE PREFERRED EMBODIMENTS

Figure 7:
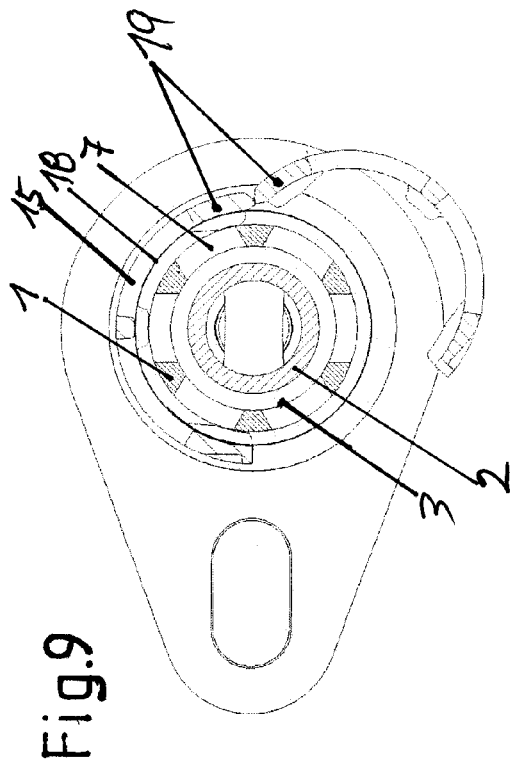
Figure 8:
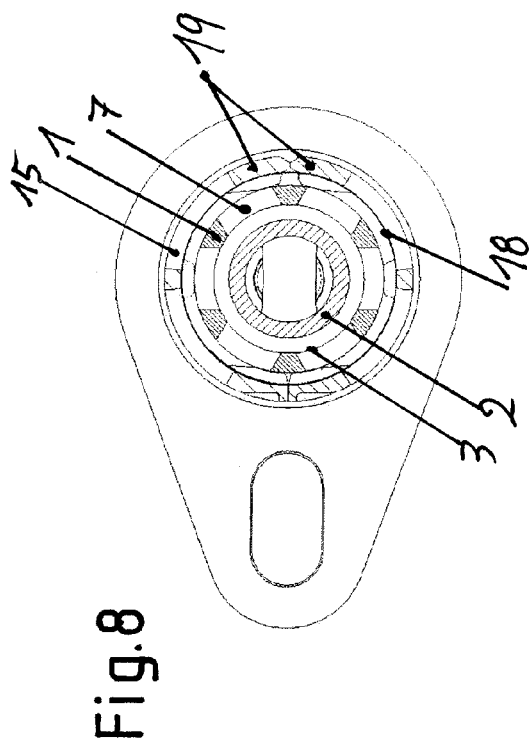
FIG. 8: a section corresponding to FIG. 7 with a one-piece non-return plate and one-piece frame part.

In FIGS. 1 to 11, as far as shown individually, 1 designates a sleeve housing in which is inserted a control slide 2 with control edges 3. The sleeve housing 1 has three ring-shaped grooves 4, 5, and 6, wherein the ring-shaped groove 5 is connected with a not-shown pressurized flow feed line and the ring-shaped grooves 4 and 6 are connected with not-shown control lines in a similarly not-shown guide housing that surrounds the sleeve housing and also holds the sleeve housing 1. In the ring-shaped groove 5 there are several openings 7 that are arranged distributed about the extent of the sleeve housing 1. Furthermore, a non-return valve designated in general with 8 is installed in the ring-shaped groove 5 and has, according to FIGS. 1 to 7 and 10, two semicircular frame parts 9 and 10 that can be connected to each other, wherein this can be realized by clips, welding, or bonding. In FIGS. 3 to 6, in each frame part there is a correspondingly shaped non-return plate 11 and 12 installed that are inserted via an eyelet 13 into a recess of the frame parts 9 and 10. The non-return plates 11 and 12 therefore can fold inward and open the cross section when pressurized flow fluid is fed on one side into the pressurized flow feed line. The non-return plates 11 and 12 are in active connection with inner surfaces 14 of the frame parts 9 and 10, so that they close the cross section also for a sudden internal pressurization. The flow cross section in the frame parts 9 and 10 is guaranteed by flow openings 15. Guide tabs 16 that guarantee the specified position of the non-return plates are provided on the frame parts 9 and 10.

As shown especially in FIGS. 1, 2, 4, and 6, filter fabrics 17 that guarantee a filtering of the hydraulic medium fed to the control slide 2 in addition to the non-return effect are provided on the outer wall of the frame parts 9 and 10.

Figure 9:
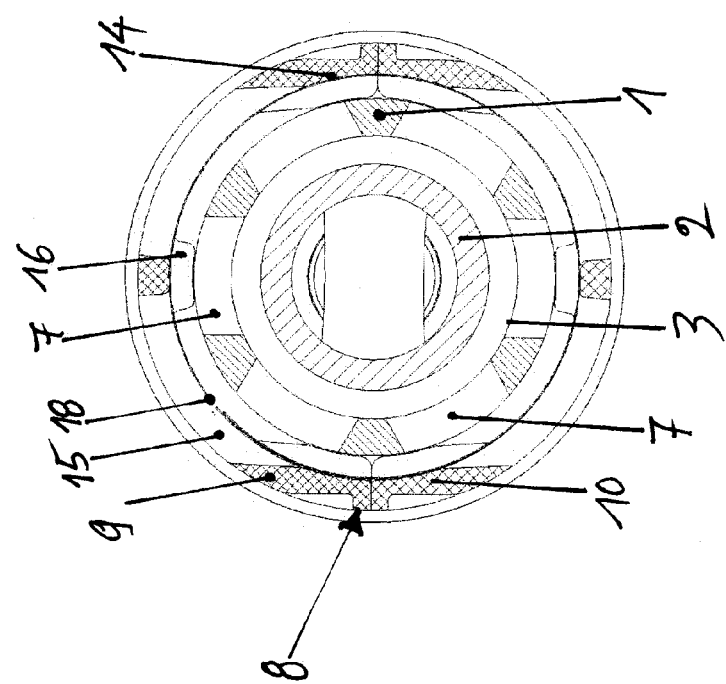
FIG. 9: a section corresponding to FIG. 8 with opened frame part.
Figure 11:
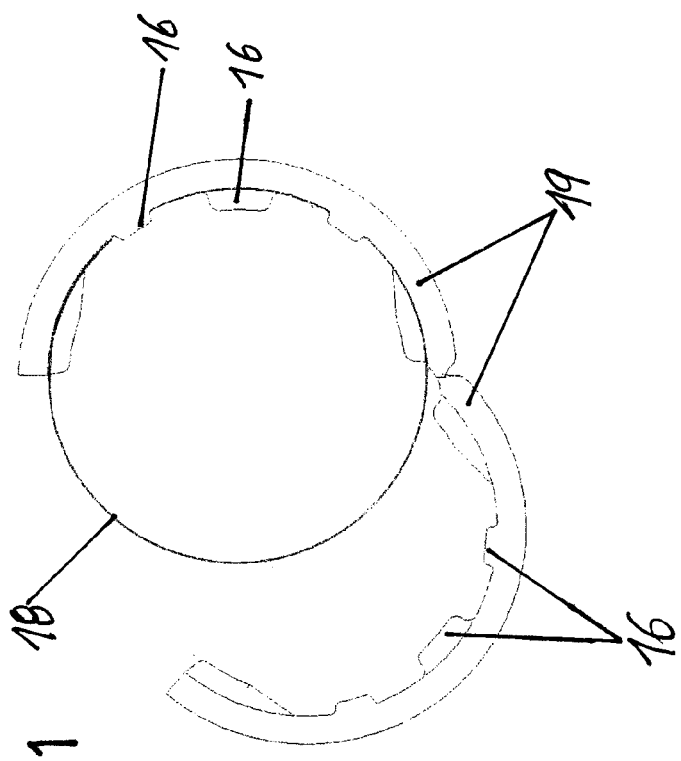
FIG. 11: a side view of a one-piece non-return plate with a one-piece, opened frame part.
Figure 10:
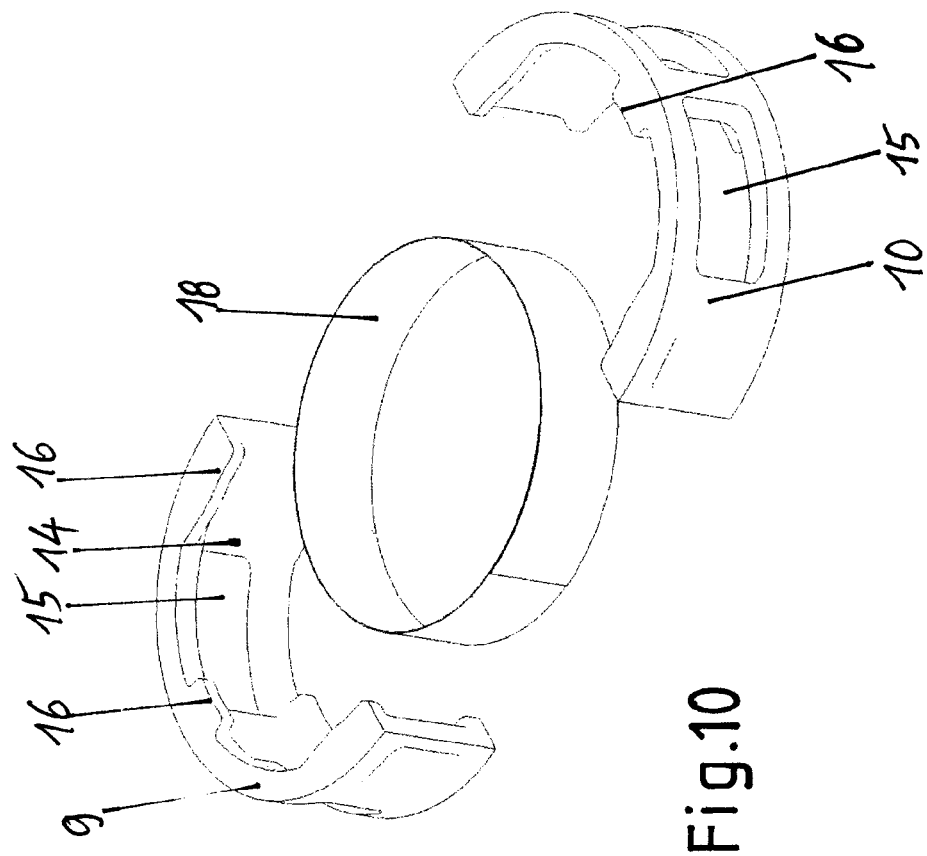
FIG. 10: individual parts of a non-return valve with a one-piece non-return plate and two semicircular frame parts.

In FIGS. 7 to 10, the non-return plate is constructed as a one-piece full ring. It can be constructed both as a closed full ring and also as a slotted full ring 18. The one-piece non-return plate is guided either by two semicircular frame parts 9 and 10 or by a one-piece frame part with two frame part halves that are connected to each other and are constructed as slotted ring elements 19 and can fold as shown in FIGS. 9 and 11.

LIST OF REFERENCE NUMBERS

1 Sleeve housing
2 Control slide
3 Control edges
4 Ring-shaped groove
5 Ring-shaped groove
6 Ring-shaped groove
7 Openings
8 Non-return valve
9 Frame part
10 Frame part
11 Non-return plate
12 Non-return plate
13 Eyelet
14 Inner surfaces
15 Flow openings
16 Guide tabs
17 Filter fabric
18 Slotted full ring
19 Ring element

The invention claimed is:

1. A control device for hydraulic media with a control valve, comprising a sleeve housing provided with radial openings, at least one pressurized flow feed line, at least one control line, and at least one return line are connected to the openings, and at least the opening for the pressurized flow feed line is connected to a ring-shaped groove in the housing, a control slide that has control edges is supported in the sleeve housing for movement in an axial direction and is actuated by a control unit, and a non-return valve is installed in the pressurized flow feed line or in the ring-shaped groove that is arranged in the sleeve housing, the non-return valve includes at least one non-return plate installed into a recess of at least one frame part, wherein the at least one non-return plate is installed within the recess of the at least one frame part via an eyelet formed on the at least one non-return plate.

2. The control valve according to claim 1, wherein the non-return plate and the frame part have a ring-shaped construction and are arranged in the ring-shaped groove.

3. The control valve according to claim 2, wherein the non-return plate and the frame part are adapted to each other so that the non-return plate can be brought into a sealing connection with an inner surface of the frame part, and the frame part has flow openings and are guided outside of the openings in a sealed manner in at least one of the ring-shaped groove or on a guide housing surrounding the sleeve housing.

4. The control valve according to claim 2, wherein there are two of the non-return plates and two of the frame parts, and the non-return plates are guided on one side on the frame parts.

5. The control valve according to claim 4, wherein the frame parts are clipped, welded, or bonded to each other.

6. The control valve according to claim 4, wherein the frame parts have guide tabs that are directed inward for the non-return plates.

7. The control valve according to claim 4, wherein filter fabrics are attached to the frame parts.

8. The control valve according to claim 1, wherein a one-piece non-return plate is provided that forms a full ring or a slotted full ring.

9. The control valve according to claim 4, wherein the two frame parts are attached to each other and form a slotted ring element.

10. The control valve according to claim 1, wherein the control valve is connected to a phase adjustment device for the variable adjustment of the control times of gas exchange valves of a reciprocating piston internal combustion engine.

* * * * *